United States Patent Office 3,242,216
Patented Mar. 22, 1966

3,242,216
ORGANOPHOSPHINE COMPOUNDS WHICH CONTAIN AT LEAST TWO PHOSPHORUS-TO-PHOSPHORUS BONDS IN SEQUENCE AND PENTAVALENT PHOSPHORUS DERIVATIVES THEREOF
Ludwig Maier, Zurich, Switzerland, assignor to Monsanto Company, a corporation of Delaware
No Drawing. Filed June 6, 1962, Ser. No. 200,321
Claims priority, application Switzerland, June 8, 1961, 6,667/61
14 Claims. (Cl. 260—606.5)

The present invention relates to organophosphine compounds which contain at least two phosphorus-to-phosphorus bonds in sequence and the preparation of these compounds. Two different processes have been found, in which equivalent reaction components, with respect to the end-products, are used.

In the first, and preferable process, aminophosphines and phosphines are reacted together, and the new compounds are formed by the splitting off of ammonia or amine. A modification of this better method is to use, in place of aminophosphines, the corresponding known iminophosphines.

Aminophosphines are understood here to be such trivalent phosphorus compounds as contain 0, 1 or 2 organic radicals, and 3, 2, or 1 amine radical attached to a phosphorus atom. They correspond to the general formula $R_mPA_{3-m}$. In this formula, which represents one of the two reaction partners in the new process, R denotes an optional, possibly unsaturated, hydrocarbon radical, and/or a hydrocarbon radical which contains substituents, A is the group $NH_2$ or the radical of a primary or secondary easily volatile amine, and $m$ is 0, 1 or 2. Preferably R has not more than 18 carbon atoms and more preferably not more than 8 carbon atoms. There is a definite limitation on $m$ which will be mentioned when the second reaction partner is described. The aminophosphines can be prepared in a known way by reacting $PCl_3$, organophosphine dihalides, or diorganophosphine halides with ammonia, primary, or secondary amines.

The iminophosphines and nitrilotriphosphines, which can in certain cases be used in place of aminophosphines, possess the formulae $(R_2P)_2NH$ and $(R_2P)_3N$, where R has the same definition as before.

Since the amine radicals must be replaced in the reaction by phosphine radicals, the radicals of easily volatile amines, e.g. methylamine, dimethylamine, ethylamine, and particularly that of ammonia, spring to mind. When several amine radicals, A, are present, only one of these need be easily volatile. The remaining amine radicals may be not easily volatile or non-volatile amines, such as aniline, toluidine, naphthylamine, guanidine, melamine, etc. These are not replaced in the reaction by phosphine radicals, but remain unchanged. However, the type of end-product depends on the number of amine radicals replaceable by phosphine radicals, as will be explained below.

The simplest aminophosphines which are suitable for use in the reaction are e.g. $P(NH_2)_3$, $CH_3P(NH_2)_2$, $(CH_3)_2PNH_2$, $P[N(CH_3)_2]_3$, $CH_3P[N(CH_3)_2]_2$, $(CH_3)_2PN(CH_3)_2$ etc., while as iminophosphines the compounds $(CH_3)_2PNHP(CH_3)_2$ $N[P(CH_3)_2]_3$, etc., should be considered.

The second reaction partner used in the preferred method for the preparation of new organophosphorus compounds having at least two P—P bonds in sequence has the general formula $R'_nPH_{3-n}$, where R' has the same significance as the previously defined radical R, and $n$ is 0, 1 or 2. Preferably, R' has not more than 18 carbon atoms and more preferably not more than about 8 carbon atoms. In the choice of the reactants there is, however, the limitation that at least one of the two possess an organic radical R or R' bond to phosphorus, i.e. the numbers $m$ and $n$ cannot both, in the same reaction be 0, and, further, at least one of the two reactants must be bifunctional, i.e. the numbers $m$ and $n$ cannot both in the same reaction be 2. The preparation of the organophosphines used in the reactions is well known. The simplest are e.g. $PH_3$, $CH_3PH_2$, $(CH_3)_2PH$, etc.

The reaction proceeds over a broad range of temperature, but it proceeds at a good rate at temperatures above about 100° C. Thus, if the reaction is not to be carried out in a pressure vessel, phosphine reactants are preferred which have boiling points above 100° C., e.g. iso-AmPH$_2$, B.P. 106–7° C.; n-C$_7$H$_{15}$PH$_2$, B.P. 169.5° C.; C$_8$H$_{17}$PH$_2$, B.P. 184–7° C.; PhPH$_2$, B.P. 160° C.; PhCH$_2$PH$_2$, B.P. 180° C.; (iso-Pr)$_2$PH, B.P. 118° C.; EtBuPH, B.P. 130° C.; Bu$_2$PH, B.P. 169–71° C.; isoPrisoBuPH, B.P. 139–40° C.; (isoBu)$_2$PH, B.P. 153° C.; Ph$_2$PH, B.P. 280° C.; etc.

According to the reaction components, organophosphorus compounds are formed which contain 2, 3, or more connected P—P bonds, and as a result the end-products are triphosphines, branched tetraphosphines, cyclic phosphines or polyphosphines, which have the grouping such as

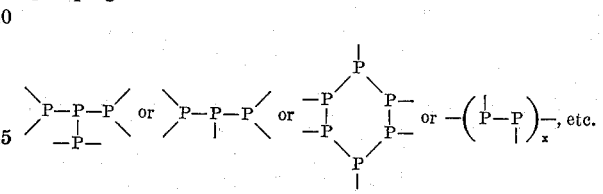

Triphosphines are obtained when either a monoaminophosphine and a primary phosphine, or a diaminophosphine and a secondary phosphine are reacted in the calculated amounts. The reaction proceeds according to the following equations I or II:

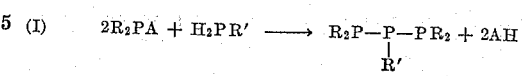

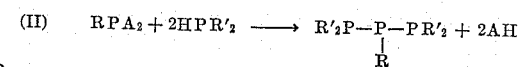

It becomes apparent that, whether the organic radicals R and R' are identical or different, either symmetric or asymmetric triphosphines are formed. It is clear that when two radicals R or R' respectively are bound to the one phosphorus atom, these may also be different from one another. One obtains, basically, the same end-products when a diphosphine imide is used in place of a monoaminophosphine:

(III)
$$R_2P-NH-PR_2 + H_2PR' \longrightarrow R_2P-P(R')-PR_2 + NH_3$$

Branched tetraphosphines are obtained if, either a triaminophosphine is reacted with three times the equimolar quantity of a secondary phosphine, or if hydrogen phosphide is reacted with three times the equimolar quantity of a monoaminophosphine. The reaction proceeds according to Equations IV or V (IV)  $PA_3 + 3HPR'_2 \longrightarrow R'_2P-P(PR'_2)-PR'_2 + 3AH$ (V)  $PH_3 + 3APR_2 \longrightarrow R_2P-P(PR_2)-PR_2 + 3AH$ Basically, the same end-products result if, in place of a monoaminophosphine, a tris-(diorganophosphine)-amine is used.

(VI)  $(R_2P)_3N + PH_3 \longrightarrow R_2P-P(PR_2)-PR_2 + NH_3$

Cyclic phosphines can be prepared by reacting a diaminophosphine with a primary phosphine. In this case the reaction can be represented by the following equation:

(VII)  $nRPA_2 + nH_2PR' \longrightarrow [-P(R)-P(R')-]_x + 2nAH$ wherein $x$ is 2, 3 or 4.

By the reaction of a difunctional phosphine with a trifunctional phopsine in suitable proportions, polymeric phosphines are obtained which may be cross-linked, in accordance with the reaction schemes.

(VIII)  $3nRPA_2 + 2nPH_3$
(IX)  $2nPA_3 + 3nRPH_2 \longrightarrow [-P(R)-P-P(R)-P(PR)-]_y + 6nAH$ wherein $y$ represents numerically the degree of polymerization.

It is clear that the degree of polymerization and cross-linking of the polymeric phosphines can be varied in Reactions VIII and IX, by varying the molar proportions of the trifunctional and the difunctional reactants. Also, by adding a definite amount of monofunctional reactant which will interrupt the chain, the molar weight of the polymer and the cross-linking of the polymer chain can be varied. The polymer may also contain a certain amount of cyclic phosphine components such as described in Reaction VII.

A second process, which has been found for the preparation of new organophosphine compounds with 2 or more P—P bonds in sequence, is based on the reaction of phosphine halides with metal salts of phosphine. In this second method, also, at least one of the two reaction components must be at least bifunctional, and at most only one of the two can be trifunctional. In general, in this second method, an organophosphine dichloride is reacted with twice the equimolar amount of a lithium, sodium, or potassium diorganophosphide. By this means, the same end-products are formed as in Equations I and II, namely triphosphines. Alernatively, phosphorus trichloride is reacted with three times the molar quantity of an alkali organophosphide, and, in this case, the end-products of Equations IV and V are formed, namely branched tetraphosphines. Where dialkali phosphides or phosphides of other, possibly divalent, metals are available and suitable for use, these can, of course, also be used in the preparation of cyclic phosphines, as in Equation VII, or of cross-linked polymeric phosphines, as in Equation VIII. This is done by reacting them with, for example, an organophosphine dichloride, or with phosphorus trichloride in appropriate proportions.

It has already been mentioned that the organic hydrocarbon radicals R and R' may bear substituents. Such substituents may be e.g. halogen, OH, OR, $NO_2$, CN, $NH_2$, NHR, $NR_2$, etc. In particular, the substituents may consists of further amino phosphine groups. This class of compounds, which is of particular importance in the process, can be represented by the following general formulae: (A)PR—R"—PR(A) and $A_2P$—R"—$PA_2$. In these formulae, A and R are again defined as before, and R" is a bivalent aliphatic hydrocarbon radical, having about 1–6 carbon atoms. The simplest representatives of this class of compounds are e.g.
$$(NH_2)CH_3P-CH_2-PCH_3(NH_2)$$
$(NH_2)_2P-CH_2-P(NH_2)_2$, etc.

The reaction is carried out by mixing the reaction components and heating till no more ammonia or amine respectively is evolved. Generally, temperatures of 50–160° C. are sufficient, preferably temperatures in excess of about 100° C., but, if necessary, the work can be carried out at higher temperatures, and by using an autoclave. Since this is an equilibrium reaction, it is advantageous to remove, continuously, from the reaction mixture, the ammonia or amine evolved in the reaction. With this end in view, base-binding agents, such as sodium bisulphate, may be added, or HCl may be introduced, depending on the circumstances. These acid agents must, however, be added in such quantity that they are present in equivalent amount to the ammonia or amine evolved. Because of the instability of the phosphine, oxygen must be excluded from the reaction mixture. The reaction can be carried out with or without a solvent.

The new organophosphorus compounds can be used as polymerization catalysts, and they are especially useful as insecticides, pesticides, etc. The phosphines of the invention, especially sulfur derivatives thereof, can also be used as oil additives, especially those phosphines which contain at least one long-chain R group to promote oil solubility. They are also valuable intermediaries as they can be substituted in all reactions undergone by tertiary phosphines, [Organophosphorus Compounds, Kosolapoff, page 98 et seq. (1950)], e.g. O, S, Se, Te, etc., can all be aded in the normal way to the P atom. According to the arrangement of the radicals R and R', stereoisomeric forms can result. The oxides, especially those containing higher alkyls or aryls, can be used as plasticizers.

By reaction with, e.g. organic halides, the corresponding phosphonium salts of tri, tetra and polyphosphines can be obtained.

*Example 1*

A mixture consisting of 7.5 g. of diphenylphosphine and 2.7 g. bis-(dimethylamino)-methylphosphine is heated at 140° C. until no more dimethylamine is evolved. 1.5 g. of dimethylamine are collected in all. During the reaction the clear solution becomes turbid and after cooling to room temperature the whole reaction mixture solidifies. It is washed with light petroleum (B.P. 100–125° C.) and recrystallized from chloroform. Yield, 4.5 g.; transparent leaflets, M.P. 134° C.

Analysis $(C_6H_5)_2P-P(CH_3)-P(C_6H_5)_2$

| Percent | Calc'd. | Found |
|---|---|---|
| C | 72.11 | 72.15 |
| H | 5.56 | 5.11 |
| P | 22.32 | 22.57 |

Example 2

A mixture of 22 g. (0.1 mole) of diphenylchlorophosphine and 19 g. (0.49 mole) of potassium is refluxed in 200 ml. of tetrahydrofuran. After a short time a vigorous reaction sets in. The solution becomes red and, finally, dark-red to black. An excess of 10.5 g. of potassium is recovered in form of a lump. Therefore, 9 g. (=0.23 mole) of potassium are used up. Then, there is added dropwise a solution of 9 g. (0.05 mole) of phenyldichlorophosphine in 40 ml. of tetrahydrofuran, thereby the reaction mixture is decolorized. By filtration 7.3 g. of potassium chloride (theory 7.4 g.) are eliminated. After evaporation of the tetrahydrofuran 13.8 g. (=58% of the theory) of pentaphenyltriphosphine are obtained in the form of crystals which are recrystallized in ether; M.P. 112–114° C.

Analysis 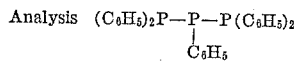

| Percent | Calc'd. | Found |
| --- | --- | --- |
| C | 75.31 | 73.08 |
| H | 5.26 | 5.28 |
| P | 19.42 | 20.68 |

The addition of sulfur can be carried out in the following way:

A solution of 0.8 g. of pentaphenyltriphosphine in 10 ml. of carbon disulfide is refluxed under nitrogen with 0.16 g. of finely comminuted sulfur for one hour. After most of the carbon disulfide is distilled off, on cooling the trisulfide of the starting compound, M.P. 167.5–169° C., quantitatively separates.

Analysis 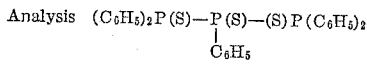

| Percent | Calc'd. | Found |
| --- | --- | --- |
| C | 62.70 | 64.81 |
| H | 4.38 | 4.10 |
| S | 16.74 | 15.16 |

Example 3

A mixture consisting of 5.88 g. (0.03 mole) of bis-(dimethylamino)-phenylphosphine (B.P. 75–76° C./0.05 mm.) and 11.16 g. (0.06 mole) of diphenylphosphine is heated under nitrogen. At 150° C. dimethylamine evolves. The mixture is heated at 170° C. for an additional hour. The theoretical amount of dimethylamine can be recovered in a trap. The mixture solidifies on cooling. The compound is recrystallized firstly in ether and then in benzene; M.P. 111–115° C. The yield is quantitative. The molecular weight in benzene is found to be 488 (theory 478). The structure of the formed pentaphenyltriphosphine is also proved by treatment with bromine in carbon tetrachloride, thereby diphenylbromophosphine, B.P. 138° C./0.4 mm.; $n_D^{20}$ 1.6618, and phenylbromophosphine, B.P. 78–79° C./0.35 mm.; $n_D^{20}$ 1.6695, are formed in a molar ratio of 2:1.

Example 4

The same compound as in Example 3 is obtained by heating 14.64 g. (0.06 mole) of dimethylamino-diphenylphosphine $(C_6H_5)_2PN(CH_3)_2$, B.P. 123–125° C./0.1 mm., and 3.33 g. (0.03 mole) of phenylphosphine $C_6H_5PH_2$ at 180° C. under nitrogen for 3 hours. The theoretical amount of 2.7 g. of dimethylamine can be recovered. The compound is recrystallized in ether and benzene; M.P. 111–115° C.

By reacting with sulfur as in Example 2, the same trisulfide is obtained.

Example 5

A mixture consisting of 9.8 g. (0.05 mole) of bis-(dimethylamino)-phenylphosphine and 5.5 g. (0.05 mole) of phenylphosphine is heated under nitrogen at 170° C. for 1 hour. Thereby 4.2 g. (theory 4.5 g.) of dimethylamine can be recovered. After cooling, either is added to the viscous product whereupon it becomes crystalline. Yield 9.0 g. (=83%). The reaction product is a cyclic 4-membered ring, as can be concluded from the determination of the molecular weight and from the melting point, 149–150.5° C. [literature, M.P. 150.5° C.; W. Kuchen and H. Buchwald, Chem. Ber., 91, 2296 (1958)].

What is claimed is:

1. A process wherein a phosphine of the formula $R_nPX_{3-n}$ where R is a hydrocarbon radical, n is an integer from 0 to 2, and X is selected from the class consisting of the hydrogen atom and halogen atoms, and a compound of the formula $R_mPA_{3-m}$ where R is as defined hereinabove, m is defined the same as n, provided both m and n cannot in the same reaction be 0 and both m and n cannot in the same reaction be 2, and A is a radical selected from the class consisting of alkali metals, $NH_2$ and radicals of easily volatile primary and secondary amines of the formula $R'NH_2$ and $R'_2NH$ wherein R' is an alkyl radical having not more than 8 carbon atoms, provided A is an amino radical when X is the hydrogen atom and A is an alkali metal when X is a halogen atom, are reacted and in the case of an aminophosphine are heated at a temperature above the decomposition point of the aminophosphine till no further substantial amount of amine is evolved.

2. A process of claim 1 wherein A is an alkali metal and X is a halogen atom.

3. A process of claim 1 wherein A is an $NR'_2$ radical and X is the hydrogen atom.

4. A process of claim 1 wherein $[N(CH_3)_2]_2PCH_3$ is heated with at least about twice the molar amount of $(C_6H_5)_2PH$ until no further substantial amount of dimethylamine evolves.

5. The process of claim 1 wherein $C_6H_5PCl_2$ is reacted in tetrahydrofuran with at least about twice the molar amount of $(C_6H_5)_2PK$.

6. A process of claim 1 wherein $[N(CH_3)_2]_2PC_6H_5$ is heated with at least about twice the molar amount of $(C_6H_5)_2PH$ until no further substantial amount of dimethylamine evolves.

7. A process of claim 1 wherein $C_6H_5PH_2$ is heated with at least about twice the molar amount of $$N(CH_3)_2P(C_6H_5)_2$$

until no further substantial amount of dimethylamine evolves.

8. A process of claim 1 wherein approximately equal amounts of $[N(CH_3)_2]_2PC_6H_5$ and $C_6H_5PH_2$ are heated until no further substantial amount of dimethylamine evolves.

9. A phosphorus compound of the formula

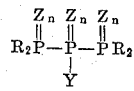

wherein R is a hydrocarbon radical, Z is selected from the class consisting of O and S, n is an integer from 0 to 1, and Y is selected from the class consisting of R and $P(Z)_nR_2$.

10. An organophosphine of the formula

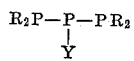

wherein R is a hydrocarbon radical and Y is selected from the class consisting of R and $PR_2$.

11.
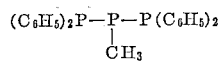
12.
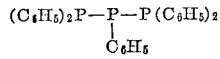
13. A pentavalent phosphorus compound of the formula
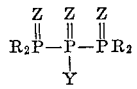
wherein R is a hydrocarbon radical, Z is selected from the class consisting of O and S, and Y is selected from the class consisting of R and $P(Z)R_2$.
14.
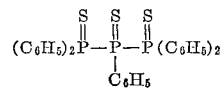
No references cited.
TOBIAS E. LEVOW, *Primary Examiner.*
OSCAR R. VERTIZ, *Examiner.*